April 1, 1952 — R. D. BROUWER — 2,591,129
LUBRICATING METHOD
Filed Jan. 25, 1943 — 2 SHEETS—SHEET 1

INVENTOR:
RODGER D. BROUWER.
BY Romeyn A. Spare
HIS ATTORNEY.

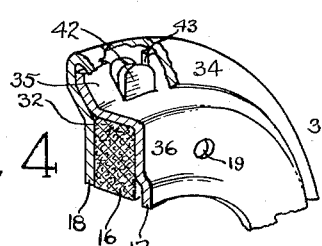
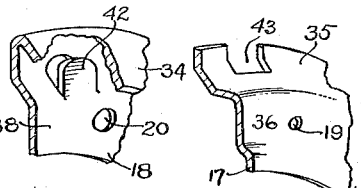
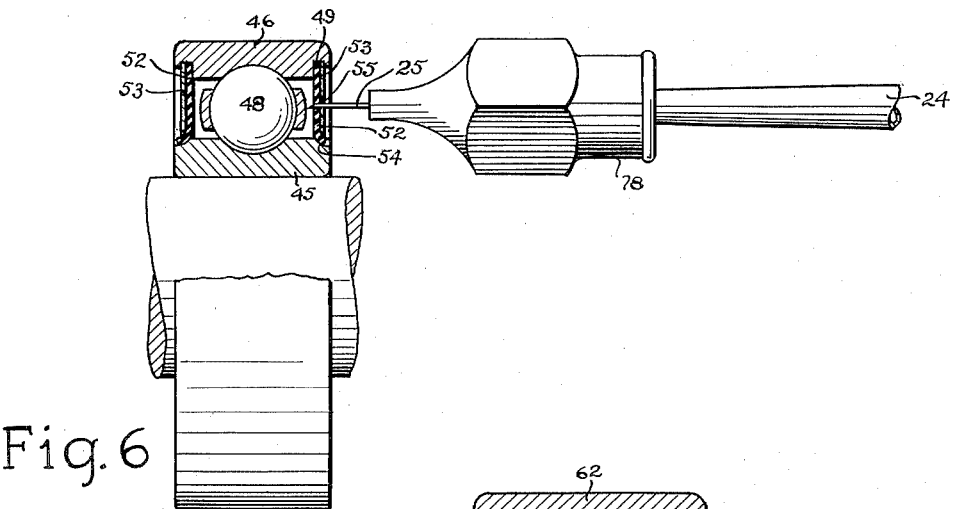
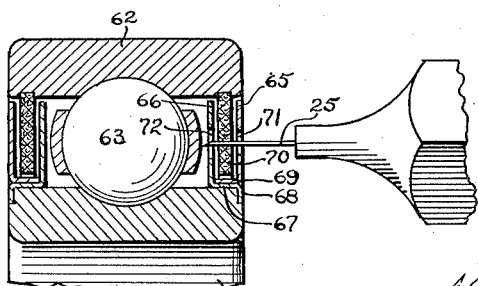
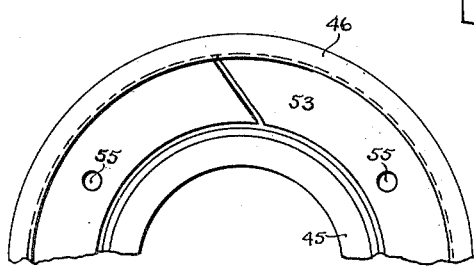
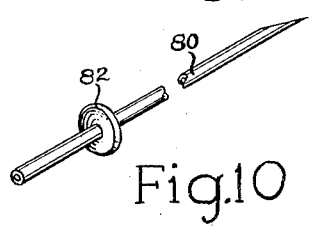
INVENTOR:
RODGER D. BROUWER.
BY Romeyn A. Spare
HIS ATTORNEY.

Patented Apr. 1, 1952

2,591,129

UNITED STATES PATENT OFFICE 2,591,129

LUBRICATING METHOD

Rodger D. Brouwer, Bristol, Conn., assignor to General Motors Corporation, Detroit, Mich., a corporation of Delaware Application January 25, 1943, Serial No. 473,502

4 Claims. (Cl. 184—1)

This invention relates to bearing lubrication, and particularly to a method and apparatus for relubricating sealed antifriction bearings.

Heretofore, to increase the life and efficiency of antifriction bearings, such as bearings having annularly spaced race rings engaged by rolling elements, it has been common practice to permanently mount seals between the race rings at each end of a lubricated bearing so that the lubricant is sealed within the bearing for the entire life of the bearing, and dust, water and other deleterious matter is excluded from the bearing. Grease as commonly used to lubricate antifriction bearings generally consists of an intimate mixture of soap and a fluid lubricating oil wherein the soap is colloidally suspended in the oil and determines the stiffness or fluidity of the grease. It is generally recognized that when a small quantity of such a grease is confined within and continuously circulated about in a bearing for a long time, or when such a grease is subjected to a use beyond its normal lubricating capacity, the oil in this grease oxidizes to a tar which causes a hardening of the grease to a consistency wherein the grease adheres in spots to the race rings and fails to circulate and provide lubrication. The reduced lubricating character of this stiffened grease, which unevenly adheres to the race rings, result in a nonuniform rolling contact of the rolling elements against the race rings as well as much increased friction and heating of the bearing, so that the life of the bearing is greatly reduced. Usually when such a sealed bearing is mounted in operative position, only a small portion of a sealed end of this bearing is accessible, and this permanently sealed structure prevents relubrication of the bearing. Consequently, unanticipated breakdowns occur in antifriction bearings which might operate indefinitely if properly lubricated.

An object of this invention is to provide an improved method and apparatus for quickly and easily lubricating a sealed antifriction bearing while the bearing remains in a sealed condition.

Another object is to provide an improved method and apparatus for rejuvenating the lubricant within a sealed antifriction bearing while the bearing remains sealed and while the bearing remains in its operative position.

A further object is to provide an improved method and apparatus for injecting lubricant through a bearing seal and into a bearing.

A still further object resides in the provision of an improved bearing seal arranged to admit a lubricant feeding member therethrough and to remain sealed against lubricant leakage after the lubricant feeding member is withdrawn.

To these ends and also to improve generally upon devices of this character, the invention consists in the various matters hereinafter described and claimed. In its broader aspects, the invention is not necessarily limited to the specific construction illustrated in the accompanying drawings in which:

Figure 4 is a fragmentary perspective view illustrating the construction of the seal shown in Figure 2;

Figure 5 is an exploded fragmentary perspective view showing the interfitting relation of the shield members of Figure 4;

Figures 6, 7 and 8 illustrate other embodiments of seals devised for my lubricating method;

Figure 9 is a fragmentary perspective view showing a yieldable mounting for an injection needle; and Figure 10 is a perspective view of the injection needle of Figure 9.

Figure 1:
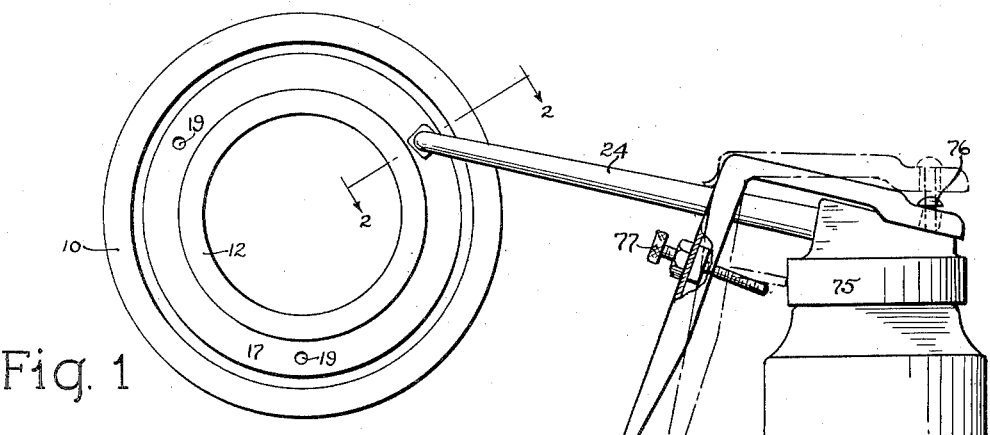
Figure 1 is a side elevation of my invention and illustrating my method of lubricating a sealed antifriction bearing.
Figure 2:
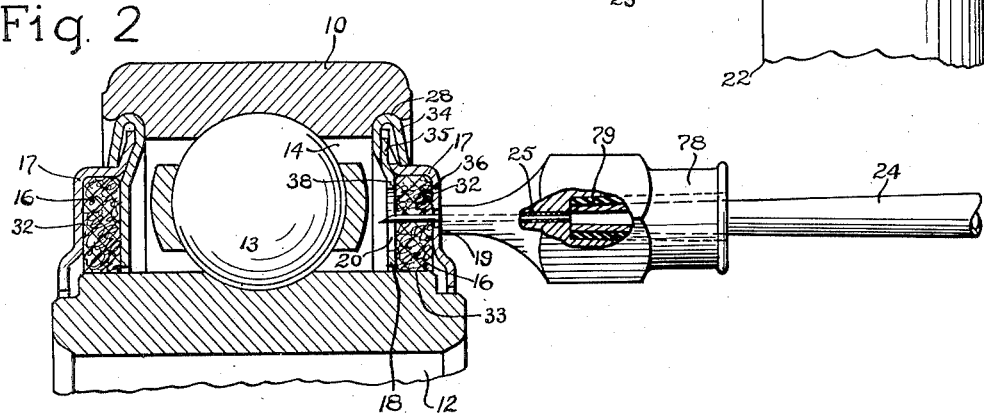
Figure 2 is an enlarged view generally in cross section along the line 2—2 of Figure 1 and showing the lubricating apparatus in lubricating position.
Figure 3:
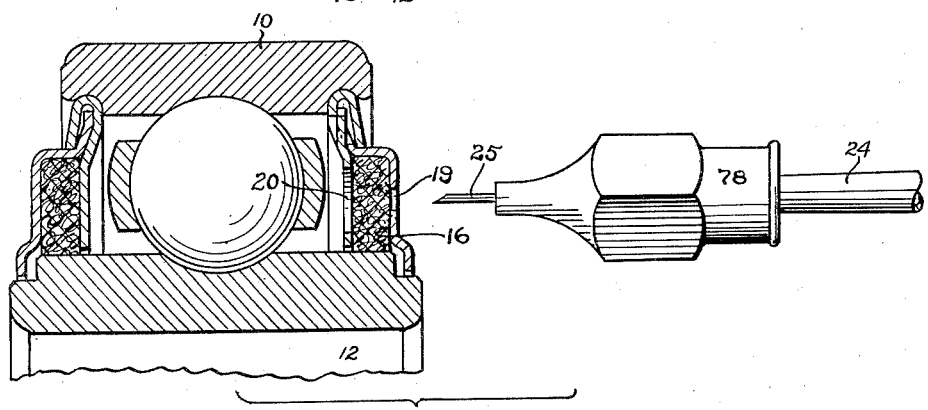
Figure 3 is a view generally corresponding to that of Figure 2 but showing the lubricating apparatus withdrawn from lubricating position.

Generally considered, an antifriction bearing having the usual race rings, as 10 and 12, engaged by rolling elements 13, is permanently closed at its ends by seals which retain lubricant such as grease within a lubricant chamber 14 and exclude foreign matter from entering the bearing. At least one of these seals has a deformable self-sealing washer, as 16, confined between a pair of guard plates or shields, as 17 and 18, which have substantially aligned through apertures 19 and 20 that open onto the washer 16. A pressure lubricator, such as a pressure oil can 22 operated by a pump lever 23, has a convenient length spout 24 terminating at its outer end in a lubricant feeding member such as a small diameter sharp-pointed hollow injection needle 25. When it is desired to lubricate the bearing, the sealing washer is pierced through by the injection needle so that the needle extends into the lubricant chamber 14 as shown in Figure 2, after which the pump lever 23 is operated to inject the desired amount of lubricant into the bearing through the needle. Upon withdrawing the needle, the washer 16, which may be of suitable resilient material, closes the pierced portion and retains its effective sealing relation. I preferably use a light bodied oil in the pressure oil can and inject sufficient of this oil into the bearing to replace the oil oxidized from the grease as well as to also rejuvenate the grease to the required softened consistency. However, if desired, my method and apparatus may be also employed for injecting a suitable grease into a sealed bearing.

In the embodiment of Figures 1 through 5, I have shown a unit-handling ball bearing wherein the outer race ring 10 is provided near each of its ends with internally peripheral self-holding grooves 28. The shields 17 and 18 are in the form of washers dished to different extents to provide therebetween an annular groove 32 that opens onto the inner race ring and which groove confines the sealing washer 16 in sealingly wiping engagement against a cylindrical surface 33 of the inner race ring 12. A flange 34 on the inner shield 18 is folded over an outer shield flange 35 and expanded into race ring sealing relation in each groove 28 as disclosed in the United States Patent to Large, No. 1,917,988. A stepped terminal wall on each outer shield 17 extends into an annular rabbet at the end of the inner race ring to aid in the exclusion of deleterious matter from the seal engaged surface 33.

To provide for convenient insertion of the injection needle 25 at various positions of the bearing, an annular wall 36 of the outer shield 17 has a plurality of the spaced apertures 19 of such a size as to easily receive the injection needle therethrough, and an annular inner shield wall 38 is provided with the correspondingly positioned through apertures 20 which are preferably of larger diameter than the apertures 19 so that the injection needle may be easily forced through the sealing washer and entered into the lubricant chamber 14 at various convenient angles without striking against the inner shield 18. As best illustrated in Figures 4 and 5, a lip 42 is laterally struck out from the shield 18 and matingly engaged against the sides of a groove 43 in the flange 35 to prevent relative rotation of the shields 17 and 18 and to maintain each set of apertures 19 and 20 in alignment for receiving the injection needle.

My sealing washer as shown in Figures 2, 3, 4 and 8, which may be of felt or like material, is composed of a resilient mass of imperforate material having closely intermingled or felted fibers. In Figure 6 I have shown a sealing washer composed of an inherently resilient imperforate material such as rubber, a synthetic rubber such as "Neoprene," cork or other suitable material. The injection needle is of such a small external diameter that the resiliency of the sealing washer will close the injection needle-pierced hole as the needle is withdrawn from the sealing washer. When this injection needle pierces a hole through a sealing washer of felt or like material, the sharp pointed advancing end of the needle wedges between and pushes aside the intermingled fibers to form a temporary hole within which the needle closely fits. As the needle is withdrawn from this hole after lubricant has been injected into the bearing, these fibers spring back together to close the hole and prevent leakage of lubricant from the bearing. The sealing washer wipes off dirt from the needle as the latter is inserted and wipes off lubricant as it is withdrawn. Also, the confining relation of the shields against my sealing washer aids the resilient sealing washer in closing the needle-pierced hole.

In Figures 6 and 7, I have shown another embodiment of a unit-handling antifriction bearing adapted for my injection method of lubrication. The inner and outer race rings 45 and 46 are provided with the usual raceways in which roll the rolling elements 48, and the outer race ring is provided near each of its ends with an internally peripheral groove 49. A resilient sealing washer 52, having self-sealing characteristics similar to those of the washer 16, is peripherally secured within each groove 49 by a split retaining ring 53 sprung into the groove and which radially extends in contact with the washer for the major portion of the distance between the race rings. The inner periphery of the sealing washer 52 is deformed into wipingly sealing engagement with an arcuate seat 54 on the inner race ring, and the retaining ring 53 is provided with a plurality of spaced needle-receiving through holes 55 so that the injection needle may be conveniently forced through the sealing washer to perform a lubricating operation as shown in Figure 6.

In Figure 8, I have illustrated another embodiment of a sealed bearing arranged for my lubricating method. The inner and outer race rings 60 and 62 are provided with raceways that receive the usual rolling elements as the balls 63. Each end of the inner race ring carries a pair of shields respectively provided with spaced annular walls 65 and 66 extending into closely spaced peripheral relation with the interior of the outer race ring 62. The wall 66 terminates in a stepped annular portion 67 seated on the cylindrical end of the inner race ring, and a terminal lip 68 of this stepped portion fits within a rabbet cut in the end of the inner race ring. A laterally projecting annular portion 69 of the other shield firmly seats on the stepped portion 67. A sealing washer 70, having the self-sealing characteristics of the washer 16, is peripherally secured within a groove in the outer race ring and extends in closely spaced lateral and internally peripheral relation to both shields. The shield walls 65 and 66 are respectively provided with a plurality of correspondingly located through holes 71 and 72 generally corresponding to the holes 19 and 20 and facilitating the entrance of the injection needle into the bearing as illustrated in Figure 8.

The pressure lubricator 22 is shown as having a lubricant container 74 demountably secured to a head 75 from which extends the spout 24, and the pump lever 23 is manually moved from its normal full line position to the broken line position to operate a pump member 76 and eject lubricant from the injection needle. A thumb screw 77 is adjustably mounted on the pump lever to strike against the head 75 and regulate the length of operative stroke for this lever so that the operator may adjust the lubricator to deliver a desired measured volume of lubricant into the bearing each time that the pump lever is operated. This thumb screw may be secured in its preadjusted position by a locknut. As shown in Figures 2, 3, 6 and 8, one form of my injection needle is mounted in and extends through the necked outer end of a tubular head 78 demountably fitted over a resilient sleeve 79 of rubber or like material on the outer end of the spout 24, the inner end of the needle bore communicating with the bore in the spout. The outer end of the needle tapers to a sharp point to facilitate piercing the sealing washer with the needle.

To avoid occasionally bending the injection needle particularly when the operator is lubricating a bearing which is difficult to reach, it is convenient to yieldably mount my injection needle as shown in Figure 9. To accomplish this, I provide a hollow injection needle 80 pointed at its outer end and having a dished guard 82 surrounding an intermediate portion of the injection needle. The rearward portion of the needle back of the guard extends through and is resiliently gripped by a generally tapering rubber-like plug 83 which is confined within the hollow tapering nose 84 of an acorn nut 85 threaded onto the end of a lubricator spout 86 corresponding with the spout 24. The forward end of the nose is apertured to freely receive the injection needle, and preferably the forward end of the resilient plug 83 extends into this bore to protect the needle. The guard seats against the nose 84 to prevent the needle from being pushed too far rearwardly into the spout. Adjustment of the nut 85 compresses the plug 83 against the spout and within the nose 84 and regulates the consequent resiliency of this plug which tends to normally hold the injection needle 80 in alignment with and laterally spaced from the spout. Whenever the operator inadvertently strikes this needle against some object, the resiliently yieldable needle mounting permits tilting of the needle and usually prevents the needle from bending.

I claim:

1. The method of lubricating an antifriction bearing provided between its race rings with a closure member formed of a resilient imperforate mass of felted fibers, which consists in piercing a small hole through said closure member by a sharp-pointed hollow needle that yieldably presses the fibers aside and passes between the fibers to wipe off the needle and to make for itself a temporary, previously non-existing hole so small that the fibers will resiliently close said hole and again wipe off the needle as the needle is withdrawn from the closure member, and feeding lubricant through said needle into the bearing before the needle is withdrawn.

2. The method of providing for lubrication of an antifriction bearing having the lubricant holding space between its race rings permanently sealed up by an inner washer of felt or the like protected by an outside metal washer, which consists in making a small aperture through the metal washer, thrusting a sharp hollow needle of small diameter through the aperture and piercing the inner washer by forcing the needle between contacting fibers to make for itself a small temporary hole, feeding lubricant through the needle into the bearing, and removing the needle, the hole being of such small size in relation to the resiliency of the inner washer that the hole will disappear as the needle is withdrawn.

3. The method of lubricating an antifriction bearing having the lubricant holding space between its race rings permanently sealed up by a resilient imperforate sealing washer, which consists in piercing a small hole through the washer by a sharp hollow needle of small diameter which separates contacting fibers or particles and passes between them to wipe off dirt from the needle and to make for itself a small temporary hole, feeding lubricant through the needle into the bearing, and removing the needle, the hole made by the needle being so small that the resilient material will close up the hole and wipe off lubricant as the needle is withdrawn.

4. The method of providing for lubrication of a sealed antifriction bearing of the type wherein the space between the race rings is sealed up by a resilient imperforate sealing washer protected on the outside by a shield, which consists in providing the shield with a small through aperture to expose a small portion of the resilient washer, inserting a sharp-pointed, lubricant conducting needle through the aperture, and thrusting the needle inwardly to pierce for itself a temporary, previously non-existing hole through the resilient washer for injection of lubricant into the bearing, the needle and the pierced hole being so small that the temporary hole will close up and disappear as the needle is withdrawn, the insertion of the sharp-pointed needle wiping off dirt and the withdrawal wiping off lubricant.

RODGER D. BROUWER.

REFERENCES CITED

The following references are of record in the file of this patent:

UNITED STATES PATENTS

| Number | Name | Date |
|---|---|---|
| 120,693 | Wood | Nov. 7, 1871 |
| 660,894 | Ernst | Oct. 30, 1900 |
| 1,115,978 | Schweinert | Nov. 3, 1914 |
| 1,370,861 | Vanderbeek | Mar. 8, 1921 |
| 1,901,580 | Bott | Mar. 14, 1933 |
| 1,930,182 | Richardson | Oct. 10, 1933 |
| 2,003,032 | Barks | May 28, 1935 |
| 2,029,072 | Hughes | Jan. 28, 1936 |
| 2,031,368 | Hodson | Feb. 18, 1936 |
| 2,038,293 | Jacob | Apr. 21, 1936 |
| 2,116,004 | Tear | May 3, 1938 |
| 2,130,009 | Hazelip | Sept. 13, 1938 |
| 2,221,554 | Okum | Nov. 12, 1940 |
| 2,234,238 | Forsberg | Mar. 11, 1941 |
| 2,273,380 | Searles | Feb. 17, 1942 |
| 2,309,985 | Ruist | Feb. 2, 1943 |